United States Patent [19]

Briet et al.

[11] Patent Number: 5,095,936
[45] Date of Patent: Mar. 17, 1992

[54] BYPASS VALVE DEVICE, IN PARTICULAR FOR THE FLUID CIRCUIT ASSOCIATED WITH A HEATER

[75] Inventors: Gilles Briet, Gueugnon; Denis Godeau, Vieilles Maisons S/Joudry, both of France

[73] Assignee: Hutchinson, Paris, France

[21] Appl. No.: 493,130

[22] Filed: Mar. 13, 1990

[30] Foreign Application Priority Data

Mar. 16, 1989 [FR] France ............ 89 03445

[51] Int. Cl.$^5$ .................................................. F16L 7/00
[52] U.S. Cl. ............................ 137/375; 137/454.6; 237/8 C
[58] Field of Search ............ 237/8 R, 8 C, 12.3 B, 237/12.3 A; 137/454.2, 454.5, 454.6, 375, 315; 251/359, 366

[56] References Cited

U.S. PATENT DOCUMENTS 3,966,119  6/1976  Harter et al. .
4,373,666  2/1983  Williams .
4,553,562  11/1985  Nakada ............... 251/366 X
4,553,563  11/1985  Nakada ............... 251/366 X

FOREIGN PATENT DOCUMENTS 3514198  10/1986  Fed. Rep. of Germany ...... 237/8 C
7332923  4/1974  France .
7907538  10/1980  France .

Primary Examiner—Henry A. Bennet
Attorney, Agent, or Firm—Herbert Dubno

[57] ABSTRACT

A bypass valve device in particular for a fluid circuit, in particular for a liquid circuit associated with a heater, the device being suitable for being interposed between the fluid inlet and outlet tubes or hoses of the heater. The device is constituted by a unit assembly shaped to provided two passages (24, 30) for the fluid and interconnected by said valve (13), the unit assembly being embedded, preferably by overmolding, in a plastic material or an elastomer material (40) similar to that of the hoses or compatible therewith.

3 Claims, 2 Drawing Sheets

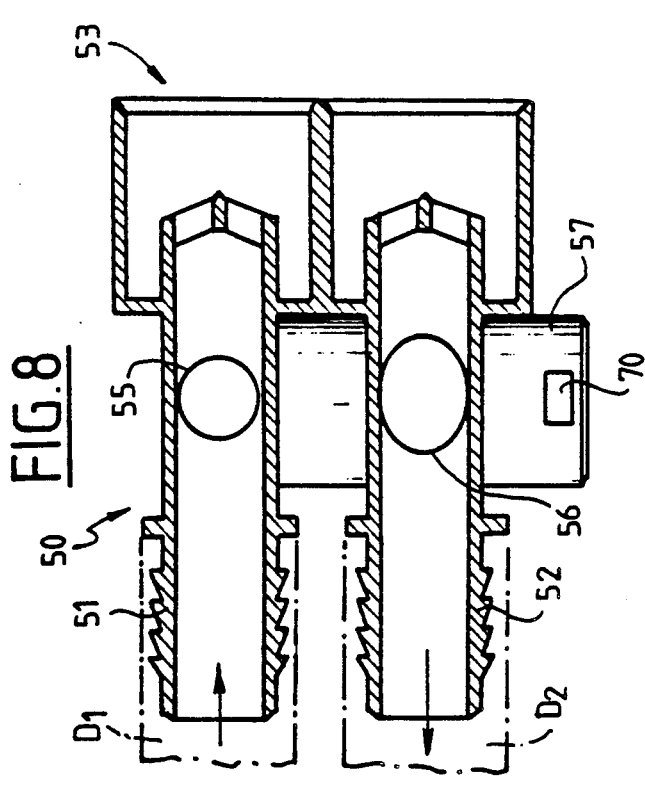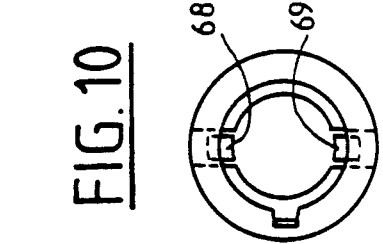

5,095,936

BYPASS VALVE DEVICE, IN PARTICULAR FOR THE FLUID CIRCUIT ASSOCIATED WITH A HEATER

FIELD OF THE INVENTION

The invention relates to a bypass valve device, in particular for a fluid circuit associated with a heater.

BACKGROUND OF THE INVENTION

The air conditioning of a cabin in a vehicle, in particular in a motor vehicle, often makes use of a heater which is directly or indirectly connected to the cooling fluid circuit of the vehicle engine. Under normal operating conditions, i.e. over a certain range of rates of flow of the fluid (generally a liquid) flowing through the heater, the flow of liquid takes place through the heater with substantially no head loss. However, when the engine is operating at high speeds, a pressure difference appears between the inlet and the outlet to the heater. In order to counteract this additional pressure, the liquid circuit is provided with a rated bypass valve that responds to a predetermined value of pressure difference to oppose said pressure difference and return the device to normal operating conditions.

In fluid circuits of this type that are already known, as described in U.S. Pat. No. 4,373,666, for example, the bypass valve is connected to the tubes or hoses for liquid flow through the heater by means of devices such as clamping collars, or the like. This means that assembly on the manufacturing line for the vehicle as a whole takes a relatively long time, and in addition there is a danger of leakage from the mechanical device constituting the bypass valve per se, or even of damage thereto. In addition, account must be taken of the desire of vehicle manufacturers to reduce assembly time, and numbers of assembly and inspection personnel, while simultaneously reducing as much as possible any risk of damaging components or of leaks appearing after assembly, thereby giving rise to a problem in the vehicle manufacturing industry of providing a bypass valve device which avoids the above-mentioned drawbacks of prior art devices.

OBJECTS OF THE INVENTION

Thus, an object of the invention is to provide such a device which, being less subject to damage than prior devices, is also capable of being installed more quickly and without any risk of leakage from the fluid (generally liquid) circuit associated with a heater.

Another object of the invention is to provide such a device suitable for being delivered to a vehicle manufacturer in the form of a unit assembly adapted to perform a plurality of functions simultaneously.

Another object of the invention is to provide such a device suitable for being incorporated in rapid connection means of the type useable by robots or the like in the vehicle industry, thereby requiring little manpower for its utilization.

Finally, an object of the invention is to provide an embodiment of such a device which makes it possible to repair the circuit in which it is fitted in a manner which is simple, or which preferably makes it possible to replace the valve simply in the event of the mechanical portions of the valve being damaged.

SUMMARY OF THE INVENTION

The present invention provides a bypass valve device for a fluid circuit, in particular for a liquid circuit associated with a heater, the device being suitable for being interposed between the fluid inlet and outlet ducts of the heater, the device being constituted by a unit assembly shaped to provide two passages for the fluid and interconnected by said valve, the unit assembly being embedded in a hardenable material compatible with the said inlet and outlet ducts.

In an advantageous embodiment, the device is integrated with the tubes or hoses constituting said ducts specifically by overmolding the valve per se in a duct-compatible elastomer or plastomer material, such that the ducts and the valve constitute a single indissociable assembly.

In another embodiment of the invention, the device including the valve is made in the form of a cartridge which is removably mounted in a reception block forming an integral portion of the inlet and outlet ducts so that it is then possible to remedy improper operation of the valve by changing the cartridge in which it is enclosed.

BRIEF DESCRIPTION OF THE DRAWING

Embodiments of the invention are described by way of example with reference to the accompanying drawing, in which:

FIG. 7 is an elevation view of a connector device for assembling hoses to a fluid circuit;

FIG. 8 is a sectional view taken on line 8—8 of FIG. 7;

FIG. 9 is a section view through a connection device provided with another embodiment of the valve device;

FIG. 10 is an end view along arrow A in FIG. 9;

FIG. 11 is a fragmentary view analogous to FIG. 9, but showing a variant; and

FIG. 12 is the corresponding end view similar to FIG. 10 but for the variant.

DETAILED DESCRIPTION

Figure 1:
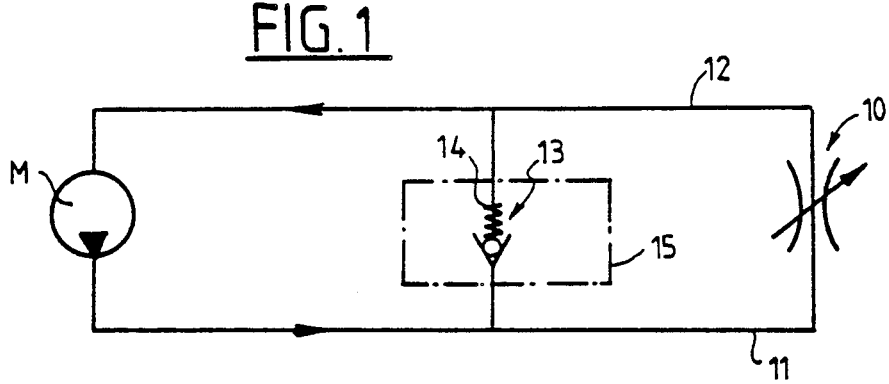
FIG. 1 is a diagram of the fluid circuit associated with a heater.

Reference is made initially to FIG. 1 which is a highly diagrammatic representation of the fluid (generally liquid) circuit associated with a load in the form of a heater 10, itself forming a part of the installation for heating the cabin of a vehicle, and in particular of a motor vehicle. The heater 10 is fed via an inlet duct 11 with "hot" liquid coming directly or indirectly from the vehicle engine M, and "cold" liquid leaving via the heater outlet duct 12 returns directly or indirectly to said engine.

In order to avoid excessive pressures which could build up during high engine revolutions, such circuits include a valve 13 between the inlet and the outlet, the valve being of the type having a rated spring 14 so that the valve opens when the pressure difference between the inlet and the outlet of the heater reaches a certain threshold δP. By way of example, and with the figures given not being limiting in any way, the valve 13 remains closed so long as δP is less than 200 mbar, and in contrast the valve 13 is fully open when δP exceeds 700 mbar.

Figure 2:
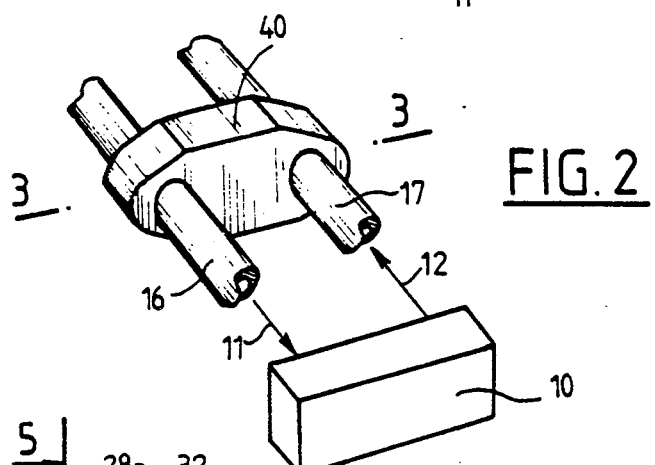
FIG. 2 is a highly diagrammatic perspective view of a first embodiment of the device of the invention.
Figure 3:
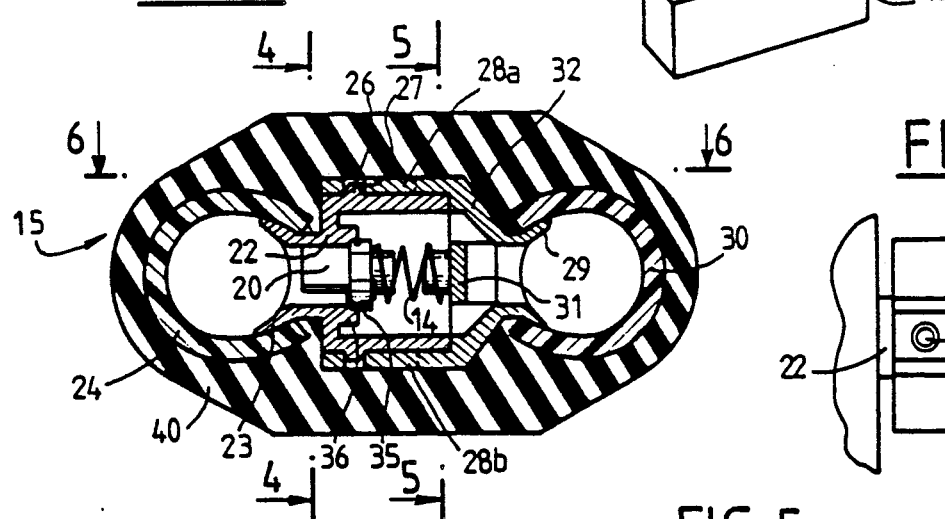
FIG. 3 is a section view through said embodiment on line 3—3 of FIG. 2.
Figure 6:
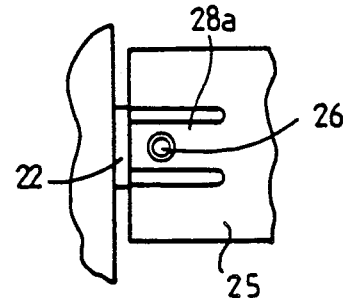
FIG. 6 is a fragmentary section on line 6—6 of FIG. 3.
Figure 4:
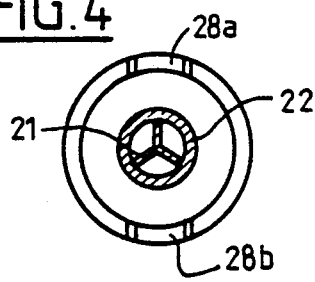
FIG. 4 is a section on line 4—4 of FIG. 3.
Figure 5:
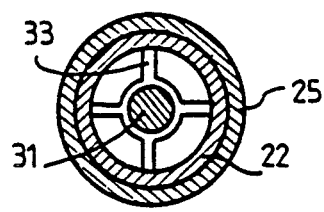
FIG. 5 is a section on line 5—5 of FIG. 3.

As shown diagrammatically in FIG. 2, and as illustrated in FIGS. 3 to 6, in a first embodiment of the invention, the valve 13 is included in a device 15 made by embedding the valve per se in an overmolding of plastomer material or elastomer material similar to that used for making the tubes or hoses 16 and 17 respectively constituting the inlet and the outlet ducts of the heater 10. In the embodiment described and shown herein, the valve per se 13 comprises a slider 20 having radial fins 21 (FIG. 4) for guiding it in a nozzle 22 having a flared end 23 opening out into a short duct 24 made of plastic material and forming one of the through passages for the fluid flowing through the heater when the device is connected to the hoses 16 and 17, with the right cross-section of the short duct 24 being constituted by the major portion of a circle. The nozzle 22 is mounted in a sleeve 25 by studs 26 which cooperate with holes 27 provided in two diametrically opposite tabs 28a and 28b of the sleeve, with the end of the sleeve which is distant from the tabs being likewise flared, as shown at 29, and received in a short duct of plastic material 30 constituting (after assembly) a fluid flow passage which is coaxial with the outlet hose 17 from the heater. An axial peg 31 (FIGS. 3 and 5) is fixed to a tapering portion 32 of the sleeve 25 by radial fins 33, and at its end it carries the spring 14 of the valve with the other end of the spring bearing against the slider 20 such that when the fluid pressure difference between the duct 24 and the duct 30 exceeds the rated value set by the spring 14, then the spring is compressed under the effect of the force acting on the slider, thereby lifting the valve head 35 off the seat 36 provided on the nozzle 22 and establishing communication between the inlet and the outlet of the fluid circuit and thus returning the pressure to its reference value.

In accordance with the invention, the sleeve 25, the nozzle 22, and the ducts 24 and 30 are embedded in a body 40 (FIGS. 2 and 3) of hardenable material, preferably by overmolding either a plastic material or else an elastomer material similar to that used for the hoses 16 and 17. By way of nonlimiting example, the body 40 is shown as being shaped to have a volume whose right cross-section is somewhat elliptical.

Regardless of whether the overmolding is performed using a plastic material or an elastomer material of the same type as or compatible with the material from which the hoses are made, said overmolding gives rise to a valve device forming a unit assembly with the said hoses, thereby simultaneously obtaining mechanical protection for the valve and a unit structure which can be assembled simply and quickly on the heater with which it is to be assembled.

For manufacturing such a device, previously-pierced hoses 16 and 17 are placed in a mold together with the assembly constituted by the valve and its ducts 24 and 30, with the block 40 then being overmolded thereon, and finally the resulting structure is unmolded.

Reference is now made to FIGS. 7 to 10 relating to a different embodiment. In this embodiment, the bypass valve device is designed to be fitted to a member 50 (FIGS. 7 and 8) which is designed to set up a fluid circuit via rapid connection means. The member 50 thus comprises endpieces 51 and 52 for receiving fluid inlet and outlet hoses D1 and D2 respectively. The endpieces 51 and 52 are integrally molded with connection means 53 provided with members for engaging and holding the heater, e.g. resilient latching members shown diagrammatically at 54. As can clearly be seen in FIGS. 7 and 9, the endpieces 51 and 52 have respective orifices 55 and 56 opening out into a short length of tube 57 suitable for receiving the bypass valve 58. This valve is similar to that described above with reference to FIGS. 3 to 6 and thus comprises a nozzle 60 for guiding a slider 61 whose head 63 cooperates with a seat 54 formed on the nozzle 60 and is subjected to the action of a rated spring 65. The end of the spring distant from the head 63 bears against the end 66 of a member 67 which is generally in the form of a sleeve fixed to the nozzle 60 and which may be held in place after being inserted in the tube 57 by two clips 68 and 69 suitable for cooperating with openings such as 70 in the tube 57.

In the variant shown diagrammatically in FIGS. 11 and 12, the valve device is mounted in a tube 57' similar to the tube 57 of the above-described embodiment, not by means of clips, but by "bayonnet" type means having male portions 70 on the end 66' of the sleeve 67' (analogous to the sleeve 67), and corresponding grooves 71 in the vicinity of the rear end of the tube 57' (which is analogous to the tube 57).

We claim:

1. A bypass valve assembly for a heater having an inlet duct and an outlet duct, said assembly comprising:
   a valve housing having a pair of ports;
   a spring-loaded valve member received in said housing and biased into a closed position, said valve member opening upon development of a pressure differential across said valve member; and
   a one-piece body of hardenable plastomer or elastomer material embedding and completely encapsulating said valve housing and integrally forming said ducts in communication with said ports in said body whereby said ducts form with said valve housing a self-contained unit, said ducts being transversely spaced apart and parallel to one another and being bridged by said valve housing so that said ducts are joined to the housing by the body.

2. A bypass valve assembly for a heater having an inlet duct and an outlet duct, said assembly comprising:
   a valve housing having a sleeve formed at one end of said housing with an outwardly flared port, and a nozzle received within said sleeve and formed at an opposite end of said housing with an outwardly flared port;
   a spring-loaded valve member received in said housing and biased into a closed position, said valve member opening upon development of a pressure differential across said valve member;
   respective parallel transversely spaced plastic tubes extending transversely to said housing and connected to said ducts, said outwardly flared ports being anchored in said ducts, said tubes being bridged by said housing; and
   a molded one-piece body of hardenable plastomer or elastomer material embedding and completely encapsulating said valve housing and encapsulating said plastic tubes whereby said body, said housing and said tubes form a self-contained unit and said tubes are joined to the housing by the body.

3. A bypass valve assembly for a heater having an inlet duct and an outlet duct in a fluid circuit having a source of heating fluid connected with a return duct and with a feed duct, said valve assembly comprising:
- a cartridge body formed unitarily with respective fittings engageable with said inlet and outlet cartridge on said heater;
- a valve housing receivable in said body and interconnecting said inlet and outlet ducts;
- a spring-loaded valve member received in said housing and biased into a closed position, said valve member opening upon development of a pressure differential across said valve member;
- quick-connect means for mounting said housing and said valve member in said body; and
- latch means for releasably retaining said body on said heater.

* * * * *